Patented June 12, 1951

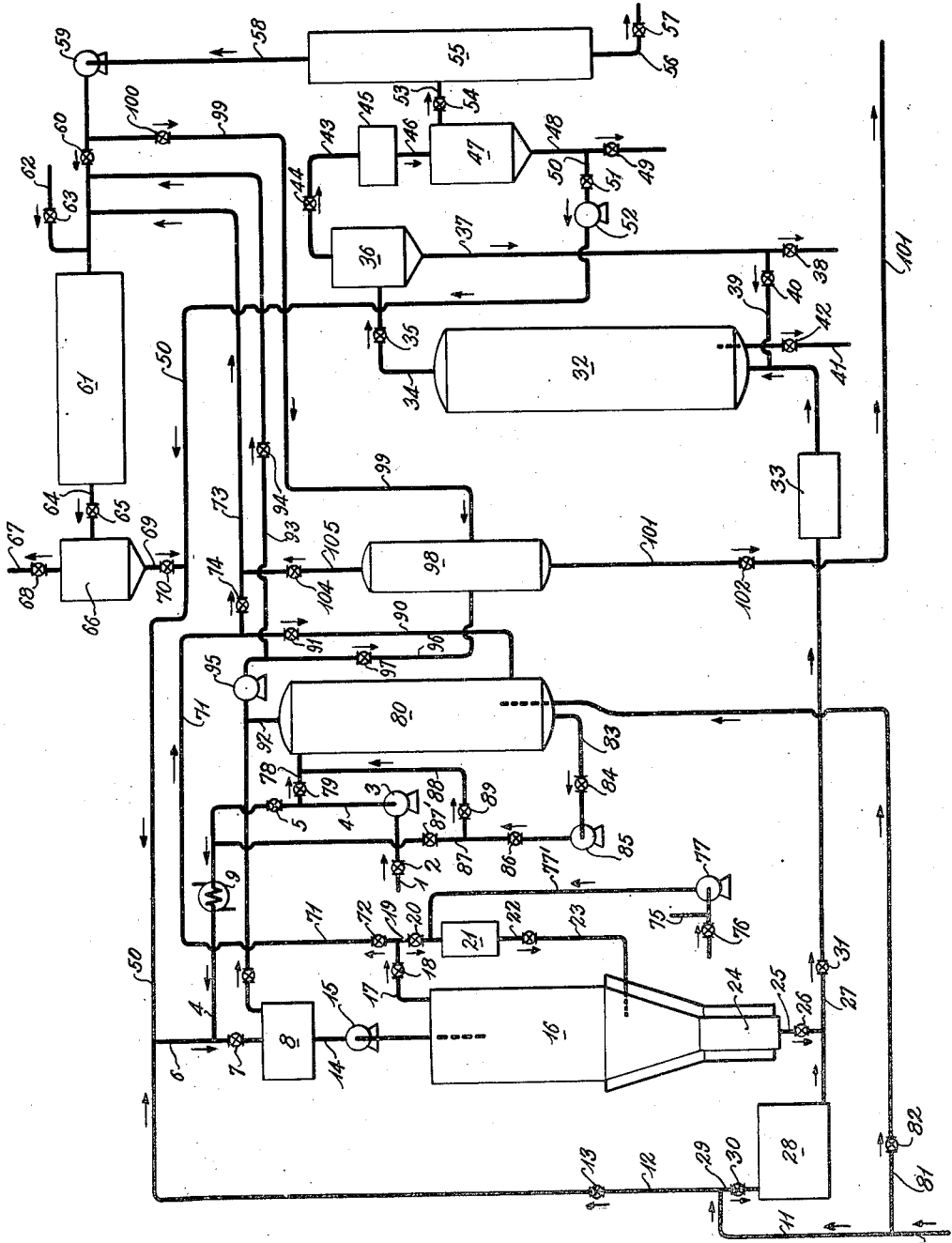

2,556,177

UNITED STATES PATENT OFFICE 2,556,177

PROCESS FOR PRODUCTION OF CARBON DISULFIDE

Bernard W. Gamson, Morton Grove, Ill., assignor to Great Lakes Carbon Corporation, Morton Grove, Ill., a corporation of Delaware Application August 17, 1948, Serial No. 44,657

6 Claims. (Cl. 23—206)

This application relates to a process for producing carbon disulfide.

In my copending applications Serial Numbers 546,427, filed July 24, 1944, and 649,730, filed February 23, 1946, now U. S. Patents Nos. 2,447,003 and 2,447,004, respectively, are described processes for producing sulfocarbons and sulfohydrocarbons and a process for making carbon disulfide from the sulfocarbon. The present invention relates to an improvement in the process for producing carbon disulfide from sulfocarbons.

In accordance with the process described in the above applications, sulfocarbons in general are made by mixing a heavy hydrocarbonaceous substance with elemental sulfur at a temperature in the range of about 425–625° F. to produce a reaction product which is liquid within said temperature range. This material is then heated at a temperature above about 625° F. but below about 1800° F. to produce a hard, black, amorphous, infusible, insoluble substance.

Depending upon the temperature to which the mixture is heated, the material is either a sulfohydrocarbon or a sulfocarbon of the composition given in the above mentioned application. The sulfocarbons are particularly useful in the production of carbon disulfide by reacting them with elemental sulfur vapors at a temperature of about 1100–1800° F.

According to a broad embodiment the present invention comprises forming a liquid mixture of elemental sulfur and a hydrocarbonaceous substance liquid in the range of about 425–625° F. at atmospheric pressure, injecting the liquid mixture in the form of droplets into a heated reaction zone at a temperature above 625° F. to convert the droplets into solid particles of sulfohydrocarbons and/or sulfocarbons, said particles being maintained in a fluidized condition, withdrawing said particles continuously, mixing them with sulfur vapor and injecting them into a carbon disulfide reaction zone at a temperature in the range of about 1100–1800° F., maintaining the particles in a fluidized condition within said carbon disulfide reaction zone, removing vapors comprising carbon disulfide and hydrogen sulfide therefrom, fractionating the vapors to separate the carbon disulfide from the hydrogen sulfide, recovering carbon disulfide, oxidizing the hydrogen sulfide to elemental sulfur and recycling the elemental sulfur.

The invention may be understood by reference to the accompanying drawing of which the following is a description and which diagrammatically illustrates the various process steps. A heavy hydrocarbon in liquid form is introduced through line 1, valve 2, pump 3, line 4, valve 5, to line 6 and valve 7 into a mixer 8. A heat exchanger or other suitable preheater 9 may be contained in line 4 to preheat the oil within a temperature range of about 300–625° F. Elemental sulfur is introduced through line 10, line 11, line 12, and valve 13 joining with line 6 and being mixed with oil from line 4. The sulfur may be molten, or may be added in any convenient way to produce a uniform mixture with the hydrocarbon.

The hydrocarbon may be any heavy hydrocarbonaceous substance having a boiling point above 350° F. and being liquid in the range of about 400–625° F. Suitable stocks are heavy straight run or cracked petroleum residues, topped or reduced crude oils, coal tar oils, shale oils and the like. For the best results the oil should have a hydrogen content of from about 4 to 12%.

The amount of sulfur added to the hydrocarbon is at least 60% of the stoichiometric equivalent of the hydrogen content in the oil and is preferably from about 90–110% thereof.

Reaction zone 8 may be maintained at a temperature of about 300–625° F. and preferably 350–500° F. The residence time will vary with the temperature employed but should be such that the mixture is still liquid when removed therefrom. It is preferably agitated or otherwise mixed to produce the uniform mixture.

The uniform mixture of sulfur and hydrocarbon is passed through line 14 and pump 15 into the reaction zone 16. It is injected by any suitable means into the top of the reactor in such a way that a fine spray comprising droplets is formed. In order to avoid carry out of the droplets, line 14 may extend into reactor 16. The reactor 16 may be partially or entirely jacketed as illustrated, a heated heat transfer fluid being passed through the jacket in order to raise the temperature to a point within the range of about 625–1800° F. and preferably about 900–1500° F. This reaction zone 16 may be constructed of any suitable corrosion resistant material. During the residence of the particles in the reaction zone they are converted, at the high temperatures used, to the hard, insoluble, infusible, amorphous particles above referred to. Hydrogen sulfide is evolved together with minor amounts of other sulfur-containing reaction products. The gases comprising principally hydrogen sulfide is removed through line 17 and valve 18. According to a preferred method, a portion of this gas is passed through line 19 and valve 20 to heater 21 wherein it is heated to a temperature above that maintained in reaction zone 16. Any suitable type of heater may be used including a pebble type heat exchanger or a tube and furnace heater having a source of heat not shown. The hot gases pass through line 22 and valve 23 being returned to the reaction zone 16. The hot gases serve the dual purpose of supplying heat to carry out the second stage of the above described reaction and produce the sulfocarbons, as well as to maintain the droplets and solid particles in suspension in a fluidized condition until the conversion is complete. The particles should be maintained in a relatively dense phase so that little or none are carried out of the reactor.

The dense, solid particles fall into the leg 24 of reaction zone 16 and may be withdrawn through line 25 and valve 26 to line 27. Here they mix with sulfur vapors supplied from sulfur vaporizer 28 into which sulfur is introduced by way of line 11, line 29 and valve 30. The mixture of sulfur vapors and sulfocarbon pass through valve 31 to reactor 32. If desired, a preheater 33 may be introduced into line 27 to raise the temperature sufficiently to carry out the subsequent reaction.

The solid particles are maintained in a fluidized condition in reaction zone 32 wherein the carbon content of the sulfocarbon is converted substantially completely into carbon disulfide. At this point also the particles should be maintained in a dense phase effecting as little carry over as possible.

The vaporous reaction products pass through line 34, valve 35 into a cyclone or other suitable separator 36. Finely divided carbon together with ash that may have been contained in the sulfocarbon is removed through line 37 and valve 38. If desired, a portion or all of this may be returned to reactor 32 through line 39 and valve 40. The reactor contains a draw off line 41 controlled by valve 42, through which a portion of the solids contained in the reaction zone 32 may be removed. Any heavy unreacted or unreactable material can be removed in this way. The vapors from cyclone 36 pass through line 43 and valve 44 to a condenser 45. This is operated at an appropriate temperature above 625° F. and preferably 900–1500° F. whereby the sulfur is liquefied but is in a fluid condition rather than viscous form. The mixture then passes through line 46 to separator 47. The sulfur is withdrawn through line 48 and a portion of it may be removed from the system through valve 49. The remainder passes through line 50 and valve 51, pump 52 and may be recycled to reaction zone 8 through line 6. The vaporous reaction products are removed from separator 47, through line 53 and valve 54 to fractionator 55. Carbon disulfide is separated from the hydrogen sulfide and recovered through line 56 and valve 57 which may lead to an appropriate cooler and storage tank not shown. The gaseous products consisting principally of hydrogen sulfide is removed through line 58, pump 59 and valve 60 to the sulfur recovery system 61. This may be any suitable system such as the so called Claus system wherein the hydrogen sulfied is burned in the presence of a catalyst, with air from line 62 and valve 63 to produce sulfur. The process may also be noncatalytic although in this case conversion to sulfur is usually less complete. The mixture of sulfur vapors from zone 61 pass through line 64 and valve 65 to separator 66. Water vapors and other gases are removed through line 67 and valve 68. The sulfur which is generally in liquid form may be removed through line 69 and valve 70 joining with line 50. The temperature should be kept at a point at which the sulfur is freely fluid instead of the highly viscous form. As an alternative a part of the sulfur may be supplied to the sulfur heater 28 by means not shown.

If the reaction temperature within zone 16 is carried at about 1000–1800° F., the major portion of the hydrogen sulfide is evolved therein. This may be passed through line 71 and valve 72 to line 73 and valve 74 joining with line 58 and thus passed to the sulfur recovery system.

As a further alternative an inert gas may be passed through line 75 and valve 76, pump 77, joining with line 19 and serve as a heat exchange medium and to fluidize the reacting mixture within zone 16.

In one preferred operation a portion or all of the hydrocarbon oil from line 1 is passed through line 78 containing valve 79 to a scrubber 80. Here it flows counter-current to upwardly rising sulfur vapors introduced through line 81 and valve 82. In this way the sulfur is absorbed in the hydrocarbon and the mixture may then be pumped through line 83, valve 84, pump 85, valve 86 and line 87 which joins with line 4 and thus introduced into the primary reactor 8. If desired, the temperature within zone 80 may be maintained in the neighborhood of 300–625° F.

According to another alternative, a part of the mixture of sulfur and oil may be passed through line 88 and valve 89, through line 72 to reactor 8.

According to another preferred embodiment, a part of all of the hydrogen sulfide from line 71 may be passed through line 90 and valve 91 into the bottom of scrubber 80 in order to remove any sulfur that may be contained in the effluent gases from reactor 16 in the hydrocarbon oil and to preheat the oil in this reaction zone. This operation may be carried out whether the elemental sulfur is introduced through line 81 or whether it is introduced directly into reactor 8 through line 12.

The scrubbed gases from scrubber 80 are passed through line 92 and may pass then through line 93 and valve 94, joining with line 58 to the sulfur recovery system.

According to a still further embodiment the gases from line 71 may be passed through pump 95, line 96 and valve 97 to a high pressure fractionator 98. Gases from line 58 may be passed through line 99 and valve 100 to high pressure fractionator 98. They may be compressed to pressures of the order of 100–500 pounds per square inch in order to effect separation of the carbon disulfide and the hydrogen sulfide. The carbon disulfide may be removed through line 101 and valve 102 to storage. The gases comprising principally hydrogen sulfide are removed through line 104 and valve 105 joining with line 73 and thus passed to the sulfur recovery system 61.

This process is particularly advantageous because it provides a method by which the sulfocarbons may be continuously manufactured in a form wherein they are particularly susceptible to ready reaction with sulfur vapors for the production of carbon disulfide. It also provides means by which the hydrogen sulfide produced in the various stages of the process and the sulfur that is carried through unreacted can be recovered and continuously recycled.

The continuous feature of the process is of a special advantage in view of the fact that the conventional type of carbon disulfide process employs solid granular or lump carbonaceous materials and is of a batch type. According to the conventional process, a batch of carbon particles is introduced into a stationary reactor and sulfur vapors passed therethrough until the carbon has been reacted to the desired extent. It has the disadvantage that large reactors must be employed and that they must be frequently shut down for cleaning and recharging. In the conventional type of reactor the particles of carbon gradually diminish in size forming a dust which tends to block the reactor and lines necessitating shut down in many instances long before the carbon has been completely consumed. Continuous processes of the present type are not adaptable to use with the conventional solid carbon particles but the process is peculiarly adapted to the hard dense carbon formed in the first stage of the present process.

I claim as my invention:

1. A process for producing carbon disulfide which comprises atomizing a uniform liquid mixture of a heavy hydrocarbonaceous material and elemental sulfur into a reaction zone, the proportion of said sulfur being at least 60% of the stoichiometric equivalent of the hydrogen content of said material, maintaining said zone at a temperature in the range of about 1000–1800° F. thereby to convert the droplets of liquid into a hard infusible, insoluble, amorphous substance consisting essentially of carbon sulfur and hydrogen in chemical combination, maintaining the particles in fluidized condition, continuously withdrawing a portion of the particles, mixing them with sulfur vapors and converting the carbon therein to carbon disulfide.

2. A process for producing carbon disulfide which comprises atomizing a uniform liquid mixture of a heavy hydrocarbonaceous material and elemental sulfur into a reaction zone, the proportion of said sulfur being at least 60% of the stoichiometric equivalent of the hydrogen content of said material, maintaining said zone at a temperature in the range of about 1000–1800° F. thereby to convert the droplets of liquid into a hard, infusible, insoluble, amorphous substance consisting essentially of carbon, sulfur and hydrogen in chemical combination, maintaining the particles in fluidized condition, continuously withdrawing a portion of the particles, mixing them with sulfur vapors and converting the carbon therein to carbon disulfide, in a reaction zone wherein said particles are maintained in fluidized condition.

3. A process for producing carbon disulfide which comprises atomizing a liquid mixture of a heavy hydrocarbonaceous material and elemental sulfur into a reaction zone, the proportion of said sulfur being at least 60% of the stoichiometric equivalent of the hydrogen content of said material, maintaining said zone at a temperature in the range of about 1000–1800° F. thereby to convert the droplets of liquid into a hard, infusible, insoluble, amorphous substance consisting essentially of carbon, sulfur and hydrogen in chemical combination, maintaining the particles in fluidized condition, continuously withdrawing a portion of the particles, mixing them with sulfur vapors and converting the carbon therein to carbon disulfide in a reaction zone wherein said particles are maintained in fluidized condition, separating the vaporous reaction products from the last mentioned fluidized zone, recovering carbon disulfide, separating hydrogen sulfide and converting it into elemental sulfur and recycling the elemental sulfur thus produced.

4. The process of claim 3 wherein hydrogen sulfide is recovered from the first mentioned reaction zone and in the second mentioned reaction zone is converted to elemental sulfur and the elemental sulfur is recycled to the first mentioned zone.

5. A process for producing carbon disulfide wherein the liquid hydrocarbonaceous substance is uniformly mixed with elemental sulfur in proportions at least 60% of the stoichiometric equivalent of the hydrogen content of said hydrocarbonaceous substance, introducing the liquid mixture into a heated reaction zone in the form of droplets, maintaining said reaction zone at a temperature in the range of about 1000–1800° F. thereby converting the droplets into solid particles, removing hydrogen sulfide from said zone, heating a portion of said hydrogen sulfide, returning the heated portion to said zone thereby maintaining the droplets and solid particles in said zone in fluidized condition, continuously withdrawing a part of the solidified particles, mixing them with elemental sulfur vapors, converting the carbon therein into carbon disulfide in a reaction zone maintained at a temperature of about 1100–1800° F., said particles being maintained in fluidized condition, removing the vapors from said zone, separating solid entrained particles from said vapors, condensing, separating and recycling unconverted elemental sulfur, fractionating the vapors to separate a hydrogen-sulfide containing gas from the carbon disulfide, recovering the carbon disulfide, subjecting the hydrogen sulfide together with the portion of hydrogen sulfide from the first mentioned reaction zone which was not recycled as heat transfer gas to oxidization, thereby converting it to elemental sulfur and recycling the elemental sulfur formed.

6. A process for producing a carbon disulfide which comprises producing a uniform mixture of a hydrocarbon and elemental sulfur which is liquid in the range of about 300–625° F., the proportion of said sulfur being at least 60% of the stoichiometric equivalent of the hydrogen content of said material, injecting the mixture in the form of liquid droplets into a reaction zone maintained at a temperature of about 1000–1800° F., thereby converting the droplets to solid particles, maintaining the solid particles and droplets in fluidized suspension introducing a preheated gas into said zone to supply heat and to maintain said particles and droplets in fluidized condition, separating solid particles, continuously mixing them with vapors of elemental sulfur, converting the carbon in said particles into carbon disulfide, recovering the carbon disulfide, separating hydrogen sulfide containing gas from the first mentioned reaction zone, scrubbing said gas with at least a portion of the hydrocarbon charge, passing the hydrocarbon charge thus used as scrubbing material to the process, separating the scrubbed hydrogen sulfide gas, converting it to elemental sulfur and recycling the elemental sulfur to the process.

BERNARD W. GAMSON.

REFERENCES CITED

The following references are of record in the file of this patent:

UNITED STATES PATENTS

| Number | Name | Date |
| --- | --- | --- |
| 2,081,576 | Carter | May 25, 1937 |
| 2,092,386 | Baehr | Sept. 7, 1937 |
| 2,330,934 | Thacker | Oct. 5, 1943 |
| 2,443,854 | Ferguson | June 22, 1948 |
| 2,447,003 | Gamson | Aug. 17, 1948 |